UNITED STATES PATENT OFFICE.

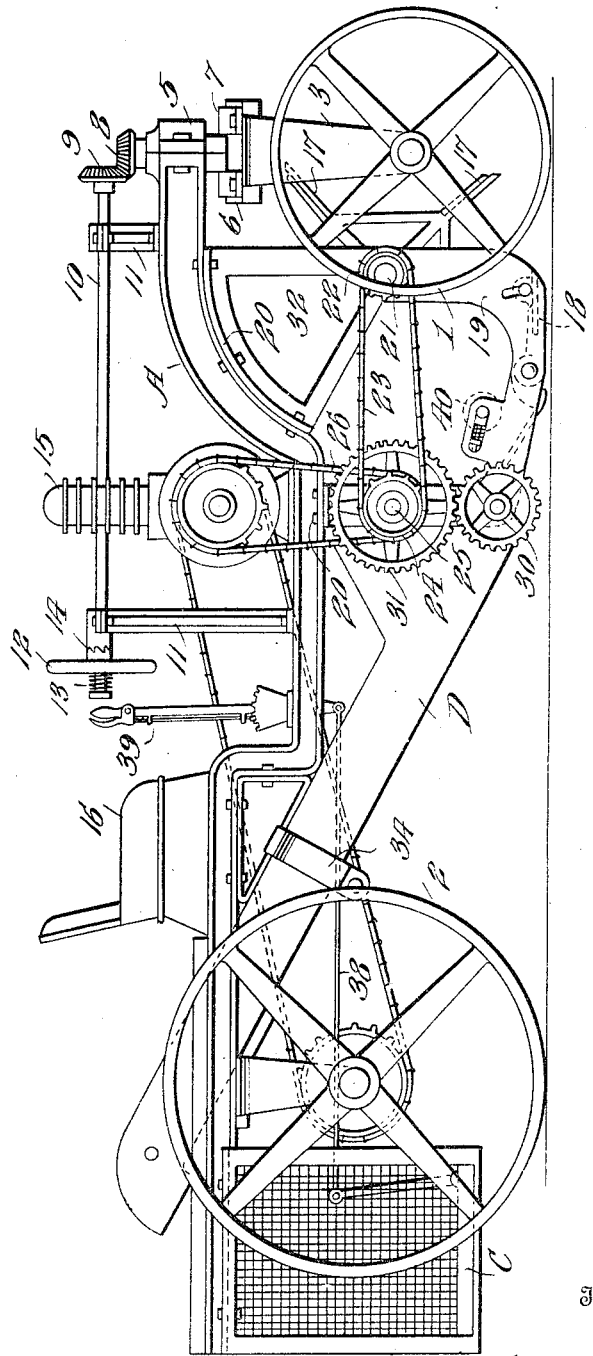

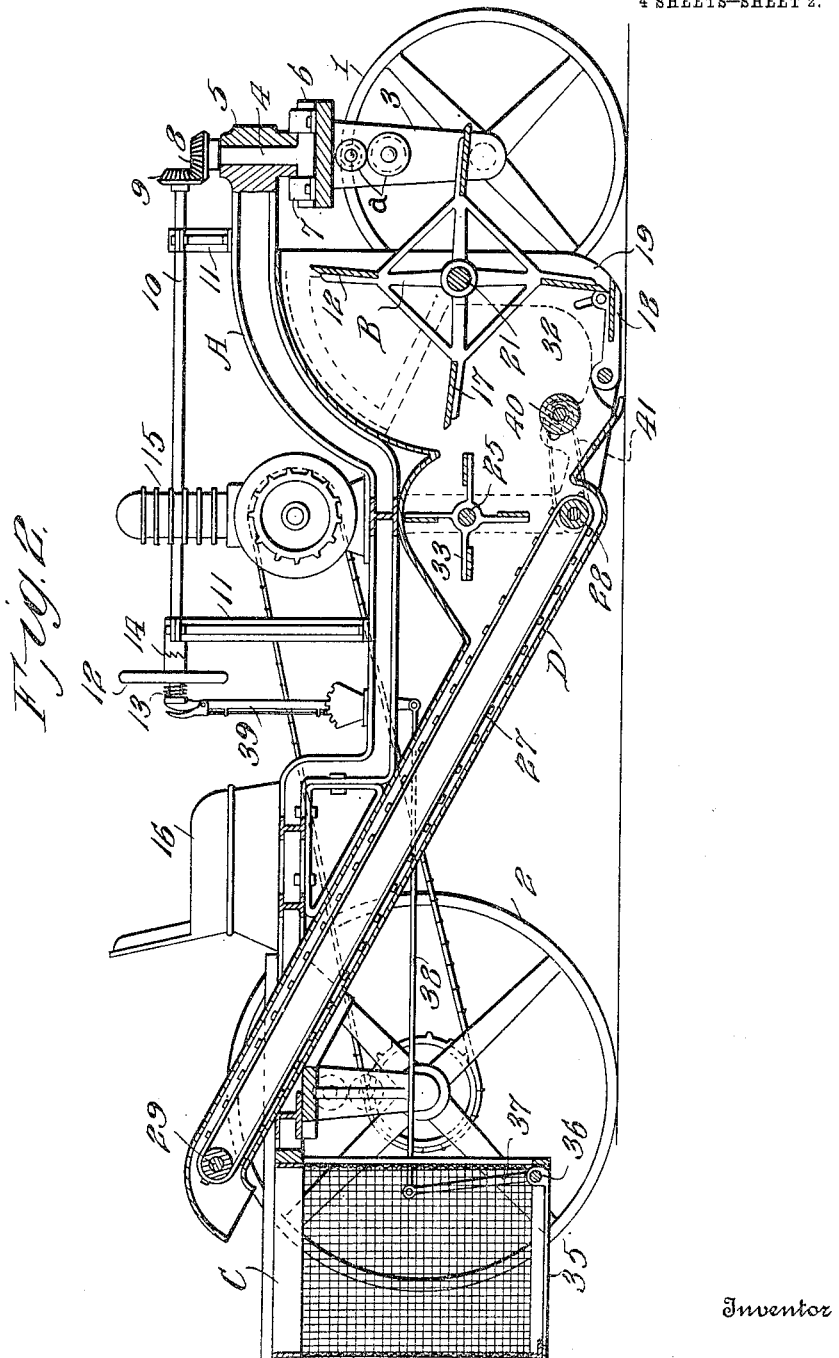

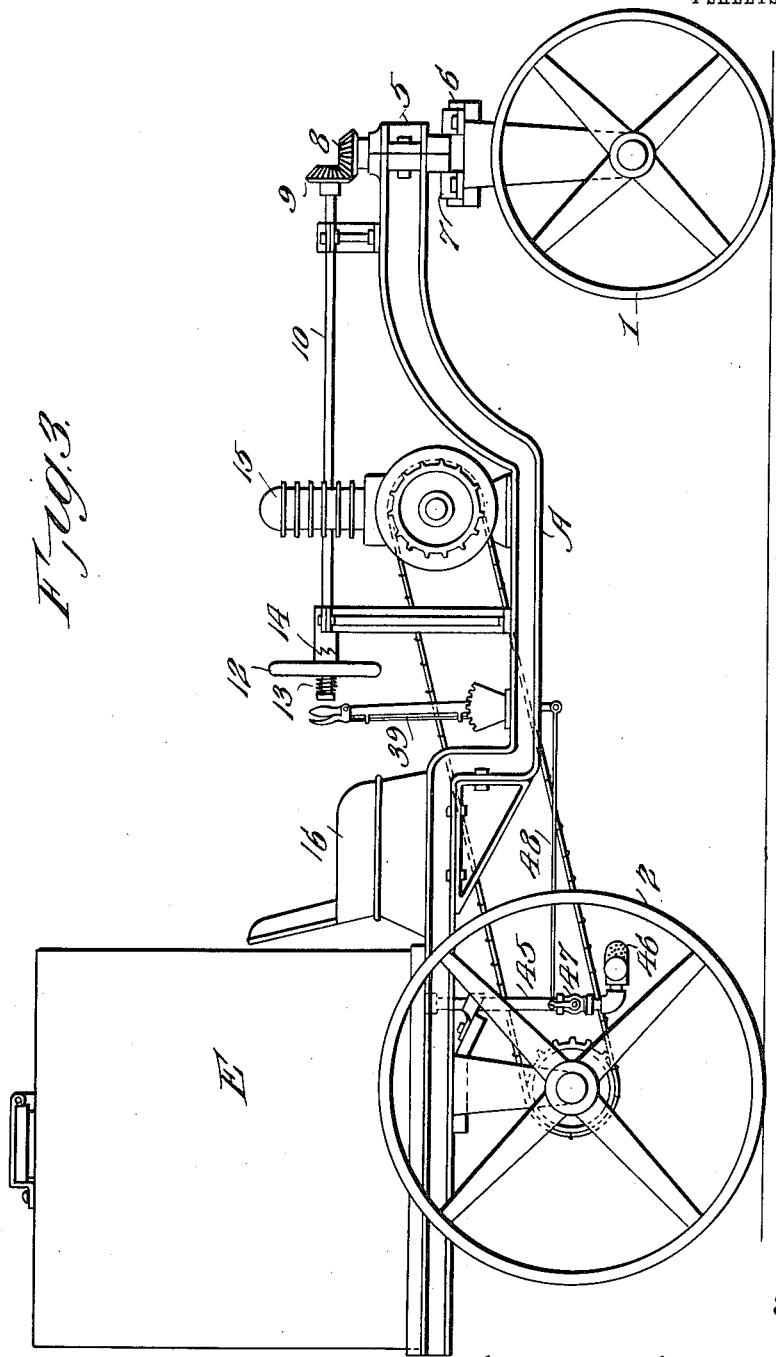

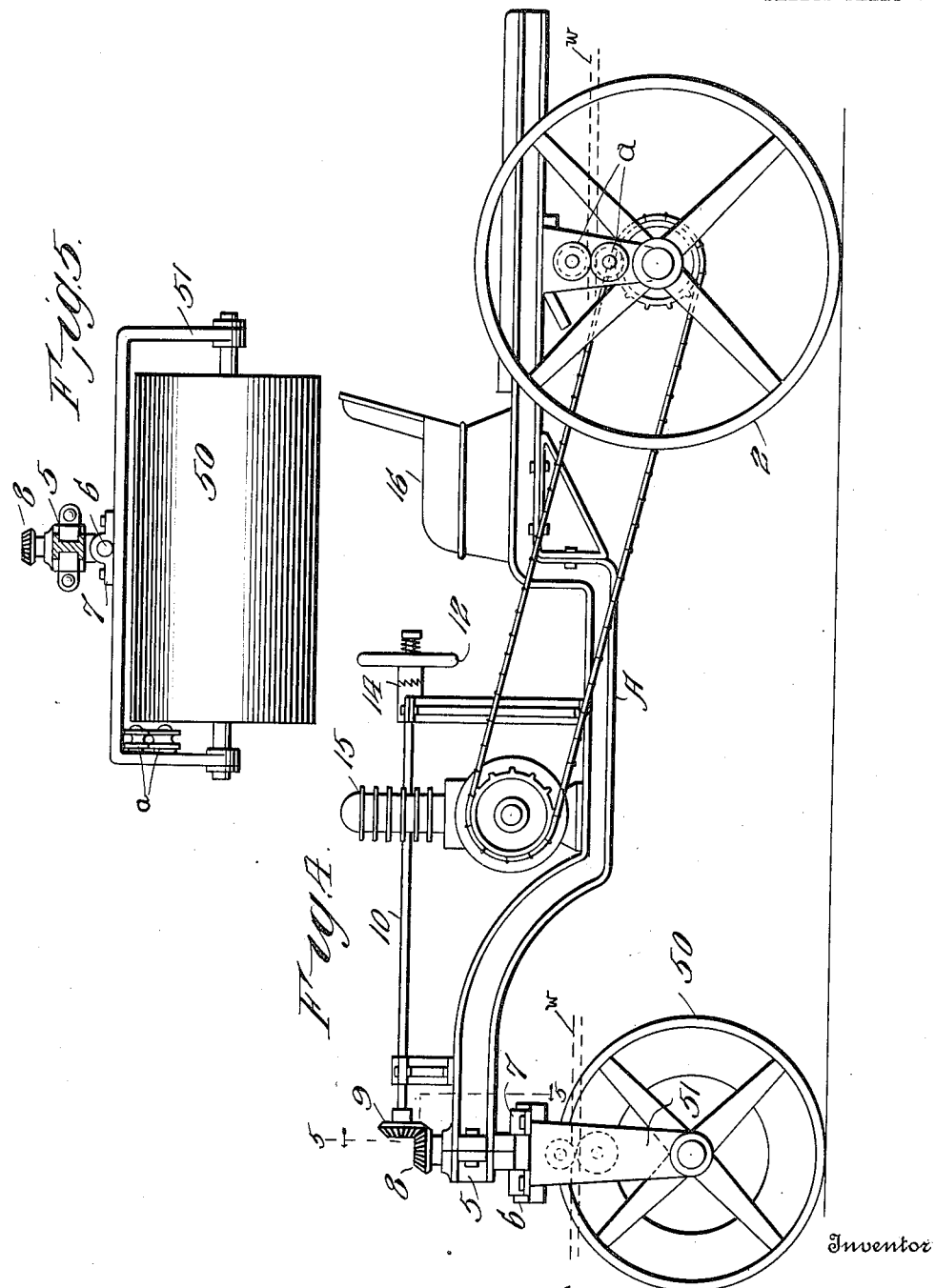

ERRETT E. PHILLIPS, OF NEW CASTLE, PENNSYLVANIA.

MOTOR-DRIVEN LAWN-MOWER.

1,060,283.      Specification of Letters Patent.      Patented Apr. 29, 1913.

Application filed November 30, 1910. Serial No. 594,859.

*To all whom it may concern:*

Be it known that I, ERRETT E. PHILLIPS, a citizen of the United States, residing at New Castle, in the county of Lawrence and State of Pennsylvania, have invented new and useful Improvements in Motor-Driven Lawn-Mowers, of which the following is a specification.

This invention relates to a lawn mower of that type including a vehicle which is self-propelled by a motor which also furnishes the power for rotating the cutting blades.

The invention has for one of its objects to improve and simplify the construction and operation of machines of this character so as to be comparatively simple and inexpensive to manufacture, reliable and efficient in use, and readily operated.

Another object of the invention is the provision of a machine which can be readily changed into a lawn mower, a roller or sprinkler.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate certain embodiments of the invention, Figure 1 is a side view of the machine as a lawn mower. Fig. 2 is a central longitudinal section thereof. Fig. 3 is a side view of the machine in use as a sprinkler. Fig. 4 is a side view of the machine in use as a roller. Fig. 5 is a sectional view on line 5—5, Fig. 4.

Similar reference characters are employed to designate corresponding parts throughout the views.

Referring to the drawings, A designates the frame of the machine of any suitable construction, and is supported on front and rear wheels 1 and 2, respectively, the front wheels being attached to an axle yoke 3 which is connected with a king bolt 4 disposed in the bearing 5 on the front part of the frame A. This king bolt has laterally-extending lugs 6 which are disposed in bearings 7 that permit the front wheels to tilt with respect to the frame A, and by attaching the bearings 7, the yoke and front wheels can be removed to permit a roller to be substituted when the machine is to be used for rolling purposes. On the upper end of the king bolt 4 is a gear 8 which meshes with a gear 9 of a steering shaft 10 journaled in bearings 11 on the frame A. At the rear end of the shaft is a steering wheel 12 which can be locked against rotation by a spring 13 forcing the wheel forwardly so that the teeth 14 on the hub of the wheel will engage corresponding teeth on the bearing 11. By pulling backwardly on the wheel and turning the shaft 10, the vehicle can be steered. Mounted on the frame A is a propelling motor 15 which is operatively connected with the rear wheels so as to propel the machine. Behind the steering wheel 12 is a seat 16 for the driver.

The cutting reel B is arranged at the front part of the machine and includes knife bars 17 which pass over a fixed cutter bar 18 that is supported on side frames 19 bolted at 20 to the front part of the main frame, the said side frames also serving to support the cutting reel B. On one end of the shaft 21 of the reel is a sprocket wheel 22 around which passes a sprocket chain 23. The sprocket chain 23 passes around a sprocket wheel 24 on a shaft 25, which shaft is driven from the engine by a sprocket chain 26 so that the engine not only propels the machine but also operates the cutting reel.

Behind the cutting reel is arranged a means for catching the cut grass and conveying it to a receptacle C supported on the rear portion of the machine. This grass-catching device consists of a duct D which has an endless conveyer 27 by which the grass is conveyed upwardly and discharged into the receptacle C. The endless conveyer or belt 27 passes around upper and lower rollers 28 and 29, the former being provided with a pinion 30 that meshes with a gear wheel 31 on the shaft 25. The front part of the duct is formed into the mouth or hopper 32 which contains a rotary fan 33 mounted on the shaft 25, so that a suction will be produced for discharging the grass upon the endless conveyer 27. The mouth or hopper extends partially over the cutting reel so that there is no danger of cut grass escaping. The front end of the duct is attached to the main frame by the side frames 19, while the rear part of the duct is provided with a bracket 34 which is bolted to the main frame adjacent the seat. By this means, the duct, blower and cutting reel can be readily removed from the main frame when the machine is to be used as a sprinkler or roller. The bottom 35 of the receptacle C is hinged at 36 and has an armature 37 that is connected by a rod 38 with an operating lever 39 adjacent the driver's seat. By manipulating this lever, the bottom door 35 of the receptacle can be opened so as to discharge the grass carried therein. It may be desirable to sharpen the knives 17 from time to time, and for this purpose a grinding roll 40 is removably mounted in the mouth of the duct behind the cutting reel, and this roll is driven by a sprocket chain 41 from the driving roll 28 of the endless conveyer. When the grinding roll is in use, the cutting reel will be driven in reverse direction to its normal direction of rotation. When not in use, the grinding roll can be removed.

When the machine is to be used for sprinkling a lawn or road, the various parts used for mowing are detached from the main frame and a tank E placed on the latter at the rear, and connected with the bottom of the tank is a pipe 45 that has a sprinkling nozzle 46. In the pipe is a valve 47 that is connected by a rod 48 with the lever 39 so that the driver can open or close the valve, as required.

In using the machine as a roller, the front wheels 1 are taken off and a roller 50, Figs. 4 and 5, substituted. The yoke 3 and wheels can be taken off together and another yoke 51 applied to the king bolt. The propulsion and steering of the vehicle is accomplished with the roller in the same manner as with the wheels 3.

In some instances, when the machine is used as a land roller it may be found desirable to eliminate the steering mechanism of the machine and guide the same by means of a wire or the like for a given distance. For this purpose, a pair of grooved guide rollers *a, a*, are journaled upon the inner surface of one of the arms of each axle yoke so that a wire *w* may be passed through such rollers, the free ends of the wire being connected to stakes spaced appropriate distances apart and driven into the ground. By means of this construction, it will be seen that the steering mechanism of the forward axle yoke of the machine may be eliminated and the machine guided over a prescribed distance for the desired purpose. After the machine has traveled from one stake to the other, the same may be turned around or reversed and the stakes withdrawn from the ground and moved a distance, to one side of the traversed path of the machine, equal to the width of the machine, the power being then applied to the driving wheels to propel the machine in the desired path, the above operation being repeated until the machine has traveled over the desired area.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. In a machine of the class described, the combination of a main frame, front and rear wheels for supporting said frame, a propelling mechanism connected to one set of wheels, and a steering mechanism connected to the other set, with a supporting frame depending from the main frame adjacent the front wheels, a stationary cutter blade or bar fixed to the lower end of said supporting frame, a cutting reel journaled in said supporting frame above the cutter bar and adapted to be rotated therein, means for rotating said reel from the propelling mechanism of the machine, a duct arranged longitudinally of the main frame having a relatively large entrance mouth or hopper surrounding said reel, an endless conveyer in said duct, means for driving the conveyer from the propelling mechanism of the machine, and a receptacle carried by the rear end of the frame and in communication with said duct.

2. In a machine of the class described, the combination of a main frame, front and rear wheels for supporting said frame, a propelling mechanism connected to one set of wheels, and a steering mechanism connected to the other set, with a supporting frame depending from the main frame adjacent the front wheels, a stationary cutter blade or bar fixed to the lower end of said supporting frame, a cutting reel journaled in said supporting frame above the cutter bar and adapted to be rotated therein, means for rotating said reel from the propelling mechanism of the machine, a duct arranged longitudinally of the main frame and having a relatively large entrance mouth or hopper surrounding said reel, an endless power conveyer in said duct, means for driving the conveyer from the propelling mechanism of the machine, and a grinding roll journaled in said supporting frame adjacent the path of movement of the blades on the cutting reel and adapted to sharpen said blades in the movement of the reel, said roll being removable and driven from the propelling mechanism of the vehicle.

3. In a machine of the class described, the combination with a main frame, front and rear wheels for supporting said frame, a propelling mechanism connected to one set of wheels, and a steering mechanism connected to the other set, of a supporting frame depending from the main frame adjacent the front wheels, a stationary cutter bar connected to the lower end of said supporting frame and a cutting reel journaled in said supporting frame and rotatable therein adjacent the cutter bar, a duct arranged longitudinally of the machine and having a relatively large entrance mouth or hopper substantially inclosing said cutting reel, a suction fan within said duct at the rear of the cutting reel, an endless conveyer in the duct, a receptacle in communication with the discharge end of the duct, and means common to said conveyer, suction fan and reel for driving the same.

4. In a machine of the class described, the combination of a main frame, front and rear wheels supporting said frame, propelling mechanism for the machine, and means for steering the machine, with a supporting frame depending from the main frame adjacent to the front wheels, a stationary cutter blade or bar fixed to the lower end of said supporting frame, a cutting reel journaled in said supporting frame above the stationary cutter bar and adapted to be rotated therein, means for rotating said reel, a duct arranged longitudinally of the main frame having a relatively large entrance mouth or hopper surrounding said reel, an endless conveyer in the duct, means for driving said conveyer, and a receptacle carried by the rear end of the frame and in communication with said duct.

In testimony whereof I affix my signature in presence of two witnesses.

ERRETT E. PHILLIPS.

Witnesses:
  OLIVER P. BROWN,
  WM. G. AYERS.